(12) United States Patent
Kuo et al.

(10) Patent No.: US 11,976,422 B2
(45) Date of Patent: May 7, 2024

(54) PULP-MOLDING PROCESS AND IN-LINE INTELLIGENTLY DRYING APPARATUS THEREFOR

(71) Applicant: Golden Arrow Printing Technology (Kunshan) Co., LTD., Kunshan (CN)

(72) Inventors: Chien-Kuan Kuo, New Taipei (TW); Chun-Huang Huang, New Taipei (TW)

(73) Assignee: GOLDEN ARROW PRINTING TECHNOLOGY (KUNSHAN) CO., LTD., Kunshan (CN)

( * ) Notice: Subject to any disclaimer, the term of this patent is extended or adjusted under 35 U.S.C. 154(b) by 384 days.

(21) Appl. No.: 17/606,041

(22) PCT Filed: May 9, 2019

(86) PCT No.: PCT/CN2019/086110
§ 371 (c)(1),
(2) Date: Oct. 24, 2021

(87) PCT Pub. No.: WO2020/223943
PCT Pub. Date: Nov. 12, 2020

(65) Prior Publication Data
US 2022/0205186 A1 Jun. 30, 2022

(51) Int. Cl.
*D21J 3/00* (2006.01)
*F26B 3/02* (2006.01)
*F26B 3/30* (2006.01)

(52) U.S. Cl.
CPC ..................... *D21J 3/00* (2013.01); *F26B 3/02* (2013.01); *F26B 3/30* (2013.01); *F26B 2200/02* (2013.01)

(58) Field of Classification Search
CPC ........ D21J 3/00; D21J 1/06; D21J 1/04; D21J 5/00; D21J 7/00; F26B 3/02; F26B 3/30;
(Continued)

(56) References Cited

U.S. PATENT DOCUMENTS 9,650,746 B2 * 5/2017 Kuo ................. D21H 27/10
11,291,253 B2 * 4/2022 Kuo ................. D21J 3/00
(Continued)

FOREIGN PATENT DOCUMENTS

BR    PI0518028 B1 *  3/2017  ............. D21J 3/00
CN    104457198 A      3/2015
(Continued)

*Primary Examiner* — Jose A Fortuna
(74) *Attorney, Agent, or Firm* — Cheng-Ju Chiang

(57) ABSTRACT

A pulp-molding process and an in-line intelligently drying apparatus therefor, comprise: implementing intelligent-circulation desiccating step and intelligently-wetting step in sequence, between pulp-dredging and forming step and thermo-compression forming step. Intelligent-circulation desiccating step comprises: in accordance to structure and/or outer contour of pulp-molding article, implementing combination of both infrared irradiation step and hot-wind blowing step, thereby self-adaptive eliminating different moistures contained within different portions of initially-compressed semi-finished product, to form evenly-dried semi-finished product. Intelligently-wetting step comprises: in accordance to structure and/or outer contour of pulp-molding article, spray-sprinkling predetermined different adaptive amount of water over different local location within dried semi-finished product, thereby forming wetted semi-finished product having averaged moisture content.

15 Claims, 3 Drawing Sheets

(58) Field of Classification Search
CPC ........... F26B 2200/02; Y10T 428/1303; D21F 13/00; Y02P 90/02
See application file for complete search history.

(56) References Cited

U.S. PATENT DOCUMENTS

2016/0362845 A1* 12/2016 Kuo ..................... D21H 11/18
2022/0205186 A1*  6/2022 Kuo ..................... F26B 3/02

FOREIGN PATENT DOCUMENTS

| CN | 106245463 A | | 12/2016 | |
|---|---|---|---|---|
| CN | 208293308 U | | 12/2018 | |
| CN | 208293316 U | * | 12/2018 | ............. D21F 13/00 |
| CN | 109137631 A | | 1/2019 | |
| CN | 208815352 U | | 5/2019 | |
| JP | 2005-290597 A | | 10/2005 | |
| WO | WO-2020223943 A1 | * | 11/2020 | ................ D21J 3/00 |

* cited by examiner

| slurrying step, comprising: using wet plant fibers, as main raw material, to produce slurry, and making said slurry stored within slurry tank; | S21 |

↓

| pulp-dredging and forming step, comprising: by one mold of a pair of male and female mold assembly for pulp-dredging and forming, collectively dredging a wet rough body from the slurry within said slurry tank to be located between the male and female mold assembly for the pulp-dredging and forming, and enabling the male and female mold assembly for the pulp-dredging and forming, to be die-closed with compressing said wet rough body, thereby integrally forming an initially-compressed semi-finished product having three-dimensional structure; | S24 |

↓

| infrared irradiation step comprising: by programmable control unit in accordance to structure and/or outer contour of pulp-molding article and a first inspecting signal generated from at least one first detector, controlling in-sequence implementations of a number of infrared lamps located at different locations within said production line, to respectively irradiate infrared rays onto said different portions of said initially-compressed semi-finished product, thereby self-adaptive eliminating said different moistures contained within different portions of said initially-compressed semi-finished product; | S30a |

S30

| hot-wind blowing step comprising: by said programmable control unit in accordance to the structure and/or the outer contour of said pulp-molding article and said first inspecting signal generated from said at least one first detector, controlling in-sequence implementations of a number of outlets of at least one first desiccating fan located at different locations within said production line, to respectively have hot winds blowing on said different portions of said semi-finished product, thereby self-adaptive eliminating different moistures contained within said different portions within said initially-compressed semi-finished product, for forming said dried semi-finished product which is more evenly dried; | S30b |

↓

| intelligently-wetting step comprising: by said programmable control unit in accordance to the structure and/or the outer contour of said pulp-molding article and a second inspecting signal generated from said at least one second detector, spray-sprinkling predetermined adaptive amount of water over at least one local location within said dried semi-finished product, thereby equalizing moisture contents of entire structure of said wetted semi-finished product which has an averaged moisture content rising between 10% to 16%; | S40 |

↓

| thermo-compression forming step, comprising: by way of die-closing of a male and female mold assembly for thermo-compression forming, thermally compressing said wetted semi-finished product, thereby forming thermally-compressed semi-finished product; | S50 |

↓

| cutting step, comprising excising or trimming superfluous edge corners on a periphery of said thermally-compressed semi-finished product or perforating, thereby forming said pulp-molding article. | S60 |

Fig. 3

PULP-MOLDING PROCESS AND IN-LINE INTELLIGENTLY DRYING APPARATUS THEREFOR

FIELD OF THE INVENTION

The present invention relates to a technical field of a pulp-molding process, and more particularly, relates to a pulp-molding process and an in-line intelligently drying apparatus for the same, with utilization of an automatic production line for massively fabricating cushion pieces.

BACKGROUND OF TECHNOLOGY

Even as packaging containers for various kinds of articles commonly intolerant of external pressure or impact, such as appliances, 3C products, furniture, foods, fragile articles, and so forth, all are equipped with cushion pieces to protect these articles, presently most of the existing processes for producing these cushion pieces are a so-called "dry-type pulp-molding process". Please refer to FIG. 1, which depicts a manipulatively schematic diagram of multiple production-processing stages with adoption of the existing dry-type pulp-molding process. Said multiple production-processing stages comprises: slurrying stage 10, pulp-dredging and initially forming stage 12, desiccating stage 14, moisture-regaining stage 16, thermo-compression forming stage 18 and cutting stage 19. Accordingly, manipulative steps corresponding to said multiple production-processing stages in processing sequences comprises: slurrying step, pulp-dredging and initially forming step, desiccation step, moisture-regaining step, thermo-compression forming step, and cutting step.

Said slurrying step is to treat slurry boards, which principally contain plant fibers, and/or waste paper pieces, as raw materials, chip the raw materials into tiny scraps by pulper along with adding water to mix, into slurry having certain concentration, and store the slurry 11 inside slurry tank 101; however, the slurry 11 that is prepared by the slurrying step 10, with treating slurry boards, which principally contains plant fibers, and/or waste paper pieces, as raw materials, is essentially congested with disproportional impurities. These impurities frequently affect product quality of the cushion pieces, e.g. causing apparent defects on the cushion pieces, or causing difficulties in its post-processing (such as implementing the thermo-compression forming step and/or the cutting step). Said pulp-dredging and initially forming step is to absorb the slurry 11 within the slurry tank 101 through either of a pair of male and female mold assembly (male mold or female mold) for pulp-dredging and initially forming and thereby forming a wet rough body 110, and then to make the male and female mold assembly of pulp-dredging and initially forming mutually compress against the wet rough body 110 in die-closing manner, for further integrally forming a semi-finished product 113 in roughly three-dimensional structure (see said desiccation step) besides initial drainage for desiccation.

Since said desiccation step is to direct the semi-finished product 113 to be directly high-temperature dried through outdoor solarized field for 24 to 48 hours, or drying room in high energy-consumption (electric energy or natural gas) manner, and to eliminate most of moistures contained within the semi-finished product 113 thereby desiccating the semi-finished product 113; next, by the moisture-regaining step, positioning the desiccated semi-finished product 113 in moisture-regaining room, with temperature and humidity control for 48 hours, where moisture or vapor is further conveyed to contact with the desiccated semi-finished product 113, for making the desiccated semi-finished product 113 reabsorbing moistures and thereby constituting moisture-regaining; and then, next implementing the thermo-compression forming step and the cutting step in sequence, wherein the thermo-compression forming step utilizes a set of male and female thermo-compression components to thermally compress on the after-moisture-regaining semi-finished product 113', for integrally forming a paper-made article such as the cushion piece having accurately three-dimensional dimension, and the cutting step is used to further excise superfluous edge corners on periphery of the paper-made article such as cushion piece.

In the aforementioned desiccation step, since desiccating time of the desiccated semi-finished product 113 within the existing solarized field is too long, or desiccating temperature of the desiccated semi-finished product 113 within the existing drying room is controlled for a long-time, it would cause high energy-consumption and/or waste of time for said desiccation step of the existing process, and being unbeneficial for manufacturing cost of the paper-made article such as the cushion piece; furthermore, since desiccating conditions (e.g. desiccating temperature and desiccating time) of the existing drying room or solarized field for entire structure of the desiccated semi-finished product 113 all are consistent, whereas shaped structure located everywhere in the desiccated semi-finished product 113 all are different, especially in shaped structures located at different locations within the desiccated semi-finished product 113 that have different thicknesses and/or heights in compliance therewith (e.g. respectively forming concave cross-sectional structure and convex cross-sectional structure). This causes that local moisture contents (or degrees of dryness) of shaped structures at the different locations are also different. For example, under the same desiccating conditions (namely under the same duty desiccating temperature and duty desiccating period provided for each of all locations) for the same desiccated semi-finished product 113, local moisture content of surface portion having thinner thicknesses become excessively low to easily incur dried cracks, whereas local moisture content of convex portion thereof having thicker thicknesses become overhigh. This leads dryness of said entire desiccated semi-finished product 13 to be uneven, thereby causing the next processings such as implementation of the moisture-regaining step or the thermo-compression forming step to become difficult, and simultaneously also causing that product quality of the paper-made article such as cushion piece gets worse.

A purpose of implementing the moisture-regaining step on the desiccated semi-finished product 113 is to improve the mechanical properties, as structural strength, of the paper-made article (such as the cushion piece). That is because the more its moisture-regaining ratio (Moisture regain) gets increased, the more the structural strength of the plant fibers in the paper-made article gets decreased, and vice versa; that is to say, textural structure of plant fibers becomes softened over and easily deformed to break upon following rise of the moisture-regaining ratio. Also, because the textural structure of the plant fibers absorbs more water to be easily puffed up and intertwisted in inconvenient processing (e.g. the following thermo-compression forming step), and to make the plant fibers easily stuck on the above-mentioned molds while the desiccated semi-finished product 113 is demolded, it is apt to result in breakage of the paper-made article, or watermarks occurred on surfaces of the desiccated semi-finished product 113. Conversely, if its moisture-regaining ratio gets overlow, it would make structural rigidity constituted from the plant fibers to get rise, namely that its flexibility gets low to make it easily brittle-fractured upon through the next processings (such as the thermo-compression forming step), and easily wrinkle-incurred and shrink-deformed on the surfaces of the desiccated semi-finished product 113. The moisture-regaining ratio mentioned herein is substantially of equating with the moisture content, approximately. However, since the moisture-regaining conditions (e.g. spraying water fully for the entire structure) for the entire structure of the desiccated semi-finished product 113 all are consistent in the existing moisture-regaining step, namely providing equal amount of moistures or vapors for structure at respective locations within the desiccated semi-finished product 113 and thereby forming moisture-regaining, it makes the moisture contents at different locations within a after-moisture-regaining semi-finished product 113' formed through the moisture-regaining step are uneven because the structure shaped at the respective location within the desiccated semi-finished product 113 are different (e.g. concave cross-sectional structure and convex cross-sectional structure which are respectively formed), especially in the thicknesses and/or heights, of the shaped structures which are also different at the different locations. For example, under the same moisture-regaining conditions (as providing equal amount of water fully for each location), a local moisture content within a thicker structure of the after-moisture-regaining semi-finished product 113' is possibly insufficient, whereas a local moisture content within another thinner structure of the after-moisture-regaining semi-finished product 113' is overhigh. At this time, it is apt to incur poor mechanical property matters in the paper-made article (as cushion piece), as stemmed from the aforementioned overhigh or overlow moisture-regaining ratio. This would cause that the post-processing such as the thermo-compression forming step gets more workability or product yield of the paper-made article gets worse.

At a time when it is ready to implement the desiccation step, the wet rough body 110 is conveyed in a manual manner from the pulp-dredging and initially forming stage 12 to the desiccating stage 14 such as the outdoor solarized field. The wet rough body 110 is dried by implementing sunlight-solarization through the desiccating stage 14 such as the outdoor solarized field for 24 to 48 hours, or by a high energy-consumption manner through the drying room; next, at a time when it is ready to implement the moisture-regaining step, the desiccated semi-finished products 113 are conveyed from the desiccating stage 14 to the moisture-regaining stage 16 in the manual manner again, and by the manual manner, the desiccated semi-finished products 113 are positioned one by one at the moisture-regaining stage 14, as a moisture-regaining room having temperature and humidity controls, for 48 hours; and then, at a time when it is ready to implement the thermo-compression forming step, by the manual manner again, the after-moisture-regaining semi-finished products 113' are conveyed from the moisture-regaining stage 16 back to the thermo-compression forming stage 18 of the production line 1 in order to implement said thermo-compression step. It can be realized therefrom that, the desiccating stage 14 and the moisture-regaining stage 16 both relative to the production line 1 of the existing process, essentially belong to an off-line production-processing stage (as located in the outdoor solarized field); in the other word, the existing dry-type pulp-molding technologies need to waste a huge amount of manpowers in frequent entry to/exit from the in-line production-processing stage and the off-line production-processing stage for conveyances, and checking or adjusting the paper-made articles. It can not totally accomplish a consistently automatic in-line production, thereby causing that its production time is too long, its labor cost is overhigh and its production efficiency is very low.

Hence, it is essential to propose a pulp-molding process used to prepare three-dimensional paper-made articles (such as cushion pieces) in order to resolve the foregoing present technical matters.

CONTENTS OF THE INVENTION

To resolve the foregoing present technical matters, a principal objective of the present invention is to provide a pulp-molding process, which belongs to a semi-wet type of pulp-molding technology, with a capability of totally accomplishing a consistent production line having multiple in-line automatic production-processing stages implemented in sequences, for massive production of pulp-molding article such as cushion pieces, to greatly reduce the longer production time and higher labor costs required for the dry-type pulp-molding technology in the prior arts, thereby raising production efficiency and product yield.

Besides, another objective of the present invention is to provide an in-line intelligently drying apparatus used with the pulp-molding process, which has a capability of self-adaptive eliminating different moistures contained within different portions of initially-compressed semi-finished product of said pulp-molding article, to form a dried semi-finished product that is evenly-dried more, and simultaneously, to spray-sprinkle predetermined different adaptive amount of water over different location within said dried semi-finished product, thereby forming a wetted semi-finished product having an averaged moisture content, to avoid poor mechanical property matters resulted from overhigh or overlow moisture-regaining ratio of a partial structure of said moisture-regaining semi-finished product (or a paper-made article) in the prior arts.

To accomplish the foregoing inventive objectives, the present invention adopts the following technical solutions that: a pulp-molding process, which is used with multiple in-line automatic production-processing stages implemented sequentially to accomplish a consistent production line for pulp-molding articles, comprises implementing the following steps in sequence: a slurrying step, a pulp-dredging and forming step, an intelligent-circulation desiccating step, an intelligently-wetting step and a thermo-compression forming step.

Said slurrying step, comprises: using wet plant fibers, as main raw material, to produce slurry, and making said slurry stored within slurry tank.

Said pulp-dredging and forming step, comprises: by one mold of a pair of male and female mold assembly for pulp-dredging and forming, collectively dredging a wet rough body in a vacuum-suction manner, from the slurry within said slurry tank to be located between the male and female mold assembly for the pulp-dredging and forming; and next, enabling the male and female mold assembly for the pulp-dredging and forming, to be die-closed with compressing said wet rough body, thereby integrally forming an initially-compressed semi-finished product having three-dimensional structure.

Said intelligent-circulation desiccating step comprises: in accordance to a structure and/or an outer contour of said pulp-molding article, providing an implementation which combines both infrared irradiation step and hot-wind blowing step, for said initially-compressed semi-finished product, and which comprises implementing sequence, the number of implementing times, and implementing period of either of said infrared irradiation step and said hot-wind blowing step, thereby self-adaptive eliminating said different moistures contained within different portions of initially-compressed semi-finished product, to form a dried semi-finished product which is evenly-dried.

Said intelligently-wetting step comprises: in accordance to the structure and/or the outer contour of said pulp-molding article, spray-sprinkling a predetermined adaptive amount of water over at least one local location within said dried semi-finished product, to form a wetted semi-finished product which is spray-sprinkled, thereby equalizing moisture contents of entire structure of said wetted semi-finished product to make the averaged moisture content of said wetted semi-finished product rising between 8% to 20%.

In said thermo-compression forming step, said wetted semi-finished product is thermally compressed to form a thermally-compressed semi-finished product, by way of die-closing of a pair of male and female mold assembly for thermo-compression forming.

Preferably, said slurrying step further comprises: making said slurry passing through a filtrating net having a number of sieving holes, to filter out impurities, which are unmatched with size scales of said sieving holes, from said slurry, thereby uniformizing size scales of said wet plant fibers contained within said slurry, and storing said filtrated slurry within said slurry tank.

Preferably, said pulp-molding process further comprises: in accordance to different structures and/or outer contours of said pulp-molding article, providing different combined implementations.

Preferably, said pulp-molding process further comprises: by a programmable control unit, controlling in-sequence implementations of said intelligent-circulation desiccating step and said intelligently-wetting step, wherein said intelligent-circulation desiccating step comprises: by said programmable control unit in accordance to the structure and/or the outer contour of said pulp-molding article and a first inspecting signal generated from at least one first detector inspecting a location where said initially-compressed semi-finished product is located relative to said production line, further controlling said combined implementations of both said infrared irradiation step and said hot-wind blowing step, and said intelligently-wetting step comprises: by said programmable control unit in accordance to the structure and/or the outer contour of said pulp-molding article and a second inspecting signal generated from at least one second detector inspecting a location where said dried semi-finished product is located at said production line, spray-sprinkling said predetermined adaptive amount of water over said at least one local location which is desiccated within said dried semi-finished product, thereby equalizing moisture contents of entire structure of said wetted semi-finished product.

Preferably, said infrared irradiation step comprises: by said programmable control unit in accordance to the structure and/or the outer contour of said pulp-molding article and said first inspecting signal generated from said at least one first detector, controlling in-sequence actuations of a number of infrared lamps located at different locations within said production line, to respectively irradiate infrared rays onto said different portions of said initially-compressed semi-finished product, thereby self-adaptive eliminating said different moistures contained within different portions of said initially-compressed semi-finished product.

Preferably, said different portions of said initially-compressed semi-finished product comprise at least one concave-surface structure where bridge formation easily incurs, and/or at least one surface structure.

Preferably, said hot-wind blowing step comprises: by said programmable control unit in accordance to the structure and/or the outer contour of said pulp-molding article and said first inspecting signal generated from said at least one first detector, controlling in-sequence actuations of a number of outlets of at least one first desiccating fan, which are located at different locations within said production line, to respectively have hot winds blowing on said different portions of said initially-compressed semi-finished product, thereby self-adaptive eliminating said different moistures contained within different portions of said initially-compressed semi-finished product.

Preferably, said intelligently-wetting step comprises: by said programmable control unit in accordance to the structure and/or the outer contour of said pulp-molding article and said second inspecting signal generated from said at least one second detector, controlling at least one spray-sprinkling component to spray-sprinkle predetermined different adaptive amount of water over different location within said dried semi-finished product, thereby equalizing moisture contents of entire structure of said wetted semi-finished product.

Preferably, said at least one local location within said dried semi-finished product is a local structure which has a local moisture content lower than local moisture contents at other locations located within said dried semi-finished product.

Preferably, averaged moisture content of said dried semi-finished product is less than 8%, and duty cycle time of the in-sequence implementations of both said intelligent-circulation desiccating step and said intelligently-wetting step is less than 2 hours.

Besides, to accomplish the foregoing inventive objectives, the present invention further adopts the following technical solutions that: an in-line intelligently drying apparatus is used with a consistent production line, where a pulp-molding process is implemented, and multiple in-line automatic production-processing stages that comprise pulp-dredging and forming stage and thermo-compression forming stage are implemented in sequence, for massive production of pulp-molding article, and is characterized in that, said in-line intelligently drying apparatus comprises: at least one conveying line, an intelligent-circulation desiccating device, an intelligently-wetting device, and a programmable control unit.

Said intelligent-circulation desiccating device is configured to dry an initially-compressed semi-finished products output from said pulp-dredging and forming stage, thereby forming a dried semi-finished product, and said intelligent-circulation desiccating device comprises a number of infrared lamps located at different locations within said at least one conveying line, at least one first desiccating fan, and at least one first detector, where said at least one first detector is used to generate first inspecting signal from inspecting a location where said initially-compressed semi-finished product is located relative to said at least one conveying line, and where said at least one first desiccating fan has a number of outlets located at different locations within said at least one conveying line.

Said intelligently-wetting device is used to wet said dried semi-finished product output from said intelligent-circulation desiccating device, and said intelligently-wetting device comprise at least one spray-sprinkling component and at least one second detector, where said at least one spray-sprinkling component is disposed along said at least one conveying line, and where said at least one second detector is used to generate a second inspecting signal from inspecting a location where said dried semi-finished product is located relative to said at least one conveying line.

Said programmable control unit is configured to control in-sequence actuations of both said intelligent-circulation desiccating device and said intelligently-wetting device, wherein said programmable control unit, in accordance to a structure and/or an outer contour of said pulp-molding article and said first inspecting signal generated from said at least one first detector, controls an implementation of combining both said number of infrared lamps and said number of outlets of said at least one first desiccating fan, and said combined actuations comprises actuating sequence, the number of actuating times, and actuating time of either of said number of infrared lamps and said number of outlets, thereby self-adaptive eliminating said different moistures contained within different portions of initially-compressed semi-finished product, to form an dried semi-finished product which is evenly-dried, and said programmable control unit controls said at least one spray-sprinkling component to spray-sprinkle a predetermined adaptive amount of water over at least one local location within said dried semi-finished product, in accordance to the structure and/or the outer contour of said pulp-molding article and said second inspecting signal generated from said at least one second detector, thereby forming a wetted semi-finished product having an averaged moisture content.

Preferably, said programmable control unit provides different combined actuations, in accordance to different structures and/or outer contours of said pulp-molding article.

Preferably, said different portions of said initially-compressed semi-finished product comprise at least one concave-surface structure where bridge formation easily incurs, and/or at least one surface structure.

Preferably, said at least one local location within said dried semi-finished product is a local structure which has a local moisture content lower than local moisture contents at other locations located within said dried semi-finished product.

Preferably, said programmable control unit controls said at least one spray-sprinkling component to spray-sprinkle predetermined different adaptive amount of water over different location within said dried semi-finished product, in accordance to the structure and/or the outer contour of said pulp-molding article and said second inspecting signal generated from said at least one second detector.

The present invention accomplishes the following beneficial technical effects that: compared with the prior arts, a pulp-molding process according to the present invention is utilized with capability of totally accomplishing consistent production line having multiple in-line automatic production-processing stages, which are implemented in sequence, for massive production of pulp-molding article such as cushion pieces, to greatly reduce longer production time and higher labor costs required for dry-type pulp-molding technologies in the prior arts, thereby raising production efficiency and product yield, and an in-line intelligently drying apparatus according to the present invention is utilized with capability of self-adaptive eliminating said different moistures contained within different portions of initially-compressed semi-finished product of said pulp-molding article, to form said dried semi-finished product which is more evenly dried, and is capable of spray-sprinkling predetermined different adaptive amount of water over different location within said dried semi-finished products, thereby forming a wetted semi-finished product having an averaged moisture content, to avoid poor mechanical property matters or a difficulty of implementing the next processings, resulting from overhigh or overlow moisture-regaining ratio of a partial structure of said moisture-regaining semi-finished product (or paper-made article) in the prior arts.

To further more realize technical characteristics and technical solutions of the present invention, please refer to the following detailed description and attached drawings with relation to the present invention.

DESCRIPTION OF THE DIAGRAMS

The attached drawings that are described herein are used to provide further realization of the present invention, acting as a portion for constituting the present application. Illustrated embodiments and its descriptions of the present invention are used for explaining the present invention, and do not constitute an improper limitation to the present invention. The drawings are that:

FIG. 3, depicts a schematically step-flowing diagram of said pulp-molding process of a preferred embodiment according to the present invention.

EMBODIMENTS OF SUBJECT MATTER

Described below will merge embodiments with drawings, of the present invention, for distinctly, completely describing technical solutions in the embodiments of the present invention, apparently the described embodiment is just a portion of the embodiments of the present invention, rather than all of the embodiments, and a scope to protection requested by the present invention should be limited to the described embodiment, but be defined in clams. Directional wordings mentioned in the present invention, such as [top], [bottom], [front], [rear], [left], [right], [inner], [outer], [lateral] and so forth, are used just for description and realization for the present invention, rather than limiting the present invention.

Figure 1:
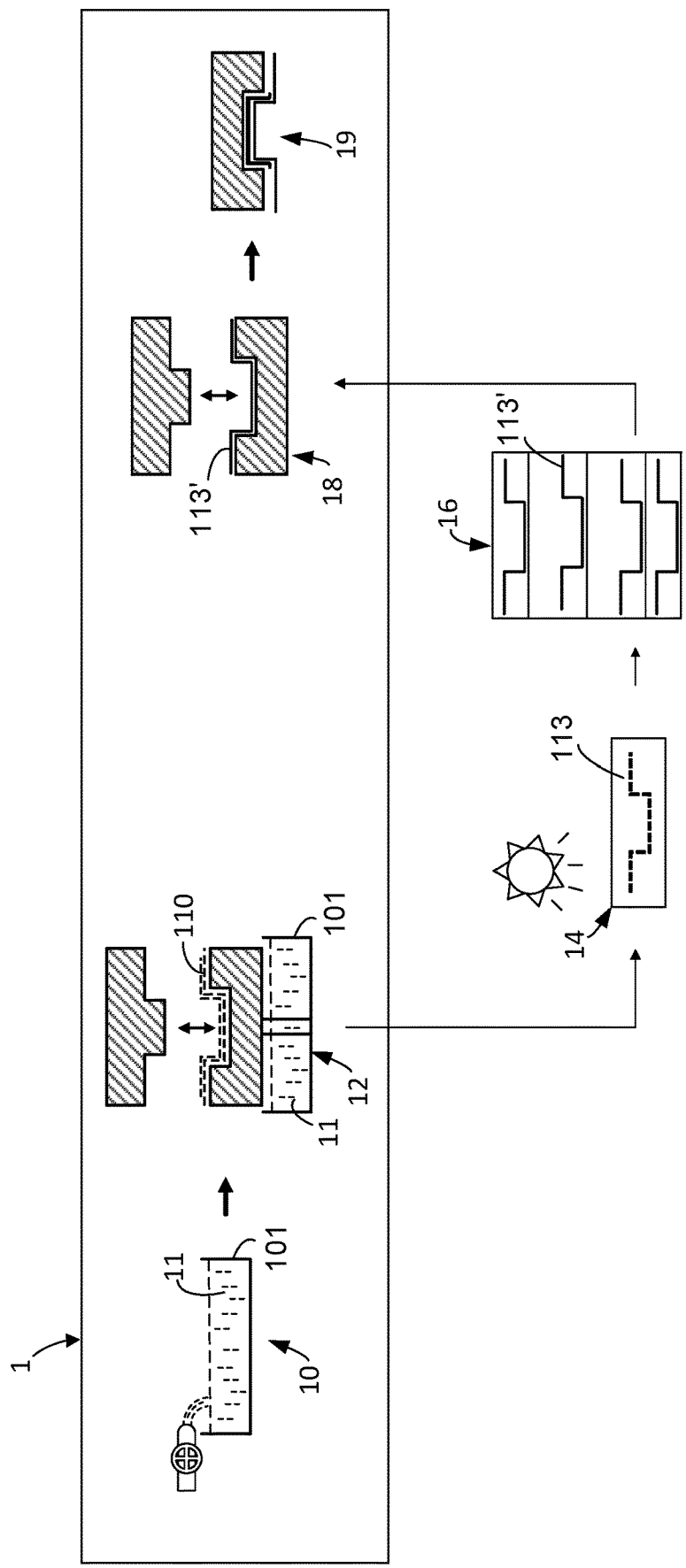
FIG. 1, depicts a manipulatively schematic diagram of multiple production-processing stages with adoption of the existing dry-type pulp-molding process.
Figure 2:
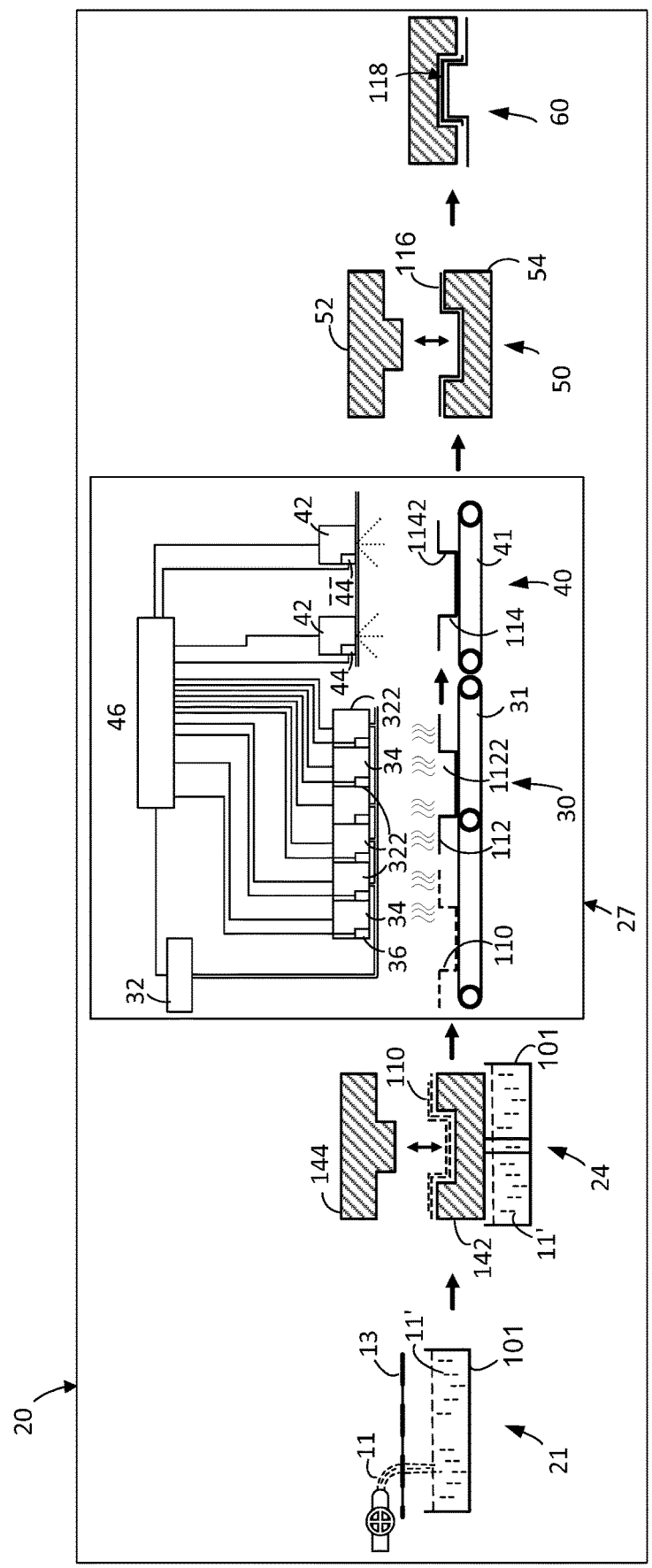
FIG. 2, depicts a manipulatively schematic diagram of multiple in-line automatic production-processing stages of consistent production line which adopts pulp-molding process of a preferred embodiment of the present invention.

Please refer to an illustration shown in FIG. 2, which depicts a manipulatively schematic diagram of multiple in-line automatic production-processing stages of a consistent production line which adopts pulp-molding process of a preferred embodiment of the present invention, said pulp-molding process is a semi-wet type of pulp-molding process and used for massive production of pulp-molding article having three-dimensional structure, such as packaging and/or cushion pieces. Said multiple in-line automatic production-processing stages principally comprises: a slurrying stage 21, a pulp-dredging and forming stage 24, an in-line intelligently drying apparatus 27, a thermo-compression forming stage 50 and a cutting stage 60. Within said consistent production line 20, at least one automatic actuating mechanism (not shown) is further disposed, between each two of said multiple in-line automatic production-processing stages, for conveying finished articles or semi-finished products. Said automatic actuating mechanism is any one mechanism which is used to accomplish said consistent production line 20. For example, one of or combination of a number of motor, roller, conveyor, robotic arms, connecting rod mechanism, guiding rail mechanism, and guiding pillar mechanism. Besides, said consistent production line 20 comprises a centralized control platform (not shown) having programmable control component used for programmably controlling running among said multiple in-line automatic production-processing stages and said automatic actuating mechanism. Since said automatic actuating mechanism can adopt the prior arts, its details will be omitted from the following context.

In said slurrying stage 21, wet plant fibers are used as a main raw material to mix into a slurry 11 having a certain concentration; in this preferred embodiment, said slurrying stage 21 further comprise a filtrating net having a number of sieving holes 13. Said filtrating net 13 is disposed within pathways where the slurry 11 flows toward a slurry tank 101, to make said slurry 11 passing through said filtrating net 13 for filtering out impurities, which are unmatched with size scales of said sieving holes, from said slurry 11, thereby uniformizing size scales of said wet plant fibers contained within said slurry 11, and storing said filtrated slurry 11' within said slurry tank 101. Because said wet plant fibers of said slurry 11' are uniformized in size scale, it can avoid a case where the paper-made article in the prior arts have apparent defects, and decrease the difficulties of its post-processings (as implementing the thermo-compression forming step and/or the cutting step).

Said pulp-dredging and forming stage 24 comprises a pair of male and female mold assembly 142, 144 used for pulp-dredging and forming, and the slurry tank 101 for storing said slurry 11' therein. By one mold (female mold 142 or male mold 144) of male and female mold assembly 142, 144 for the pulp-dredging and forming, a wet rough body is collectively dredged in a vacuum-suction manner from the slurry 11 within the slurry tank 101 to be located at between the male and female mold assembly 142, 144 for the pulp-dredging and forming; and then, the male and female mold assembly 142, 144 for the pulp-dredging and forming are enabled to mutually compress the wet rough body again for implementing die-closing, thereby further integrally forming an initially-compressed semi-finished product 110, with a rough three-dimensional structure, of said pulp-molding article, in addition to initial draining desiccation.

Please further refer to FIG. 2, where said in-line intelligently drying apparatus 27 is principally structured with: at least one conveying line, an intelligent-circulation desiccating device 30, an intelligently-wetting device 40, and a programmable control unit 46. In this preferred embodiment, said at least one conveying lines comprises a first conveying line 31 used within said intelligent-circulation desiccating device 30, and a second conveying line 41 used within said intelligently-wetting device 40.

Said intelligent-circulation desiccating device 30 is configured to dry said initially-compressed semi-finished product 110 output from said pulp-dredging and forming stage 24, thereby forming a dried semi-finished product 112 which is evenly-dried. Said intelligent-circulation desiccating device 30 comprises said first conveying line 31, at least one first desiccating fan 32, a number of infrared lamps 34 located at different locations within said first conveying line 31, and at least one first detector 36. Said first conveying line 31 is used to carry said initially-compressed semi-finished product 110 from the location of said pulp-dredging and forming stage 24, and at the same time when said dried semi-finished product 112 is dry-formed in a drying process, said initially-compressed semi-finished product 110 is automatically conveyed to said intelligently-wetting device 40. Said at least one first desiccating fan 32 has a number of outlets 322 located at different locations within said first conveying line 31; in this preferred embodiment, said number of outlets 322 are disposed in one-by-one arrangement along a direction of conveying said initially-compressed semi-finished product 110 within said first conveying line 31 (as referring to a left-to-right directional arrow in the figure), thereby respectively making hot wind blowing on said initially-compressed semi-finished product 110 at different time sequences thereof and/or different locations therein. For example, a hot wind has a working temperature range from 173° C. to 182° C.; in another preferred embodiment, said intelligent-circulation desiccating device 30 further comprises a second desiccating fan (not shown) having a number of outlets (not shown) which are disposed in one-by-one arrangement along an extending direction of said first conveying line 31, for respectively having cold wind blowing on said initially-compressed semi-finished product 110 at different time sequences thereof and/or different locations therein. Said number of infrared lamps 34 are disposed in one-by-one arrangement along said conveying direction of said first conveying line 31, for respectively irradiating infrared rays onto said initially-compressed semi-finished product 110 at different time sequences thereof and/or different locations therein. For example, working temperature range of the infrared lamps is from 173° C. to 182° C. Said at least one first detector 36 is configured to instantly inspect respective location where said initially-compressed semi-finished product 110 is located within said first conveying line 31 upon being conveyed, thereby correspondingly generating a first inspecting signal; in this preferred embodiment, said at least one first detector 36 comprises a number of first detectors 36. Said number of first detectors 36 are corresponded to locations where said number of infrared lamps 34 and said number of outlets 322 are located, and are respectively disposed in one-by-one arrangement along said conveying direction of said first conveying line 31.

Said programmable control unit 27, such as a System on Chip or PLC controller, and so forth, is configured to programmably control in-sequence actuations of both said intelligent-circulation desiccating device 30 and said intelligently-wetting device 40. For example, after said intelligent-circulation desiccating device 30 is firstly actuated, next said intelligently-wetting device 40 is actuated. In another preferred embodiment, said programmable control unit 27 can be further controlled by said centralized control platform (not shown) of said said consistent production line 20. For actuation of said intelligent-circulation desiccating device 30, said programmable control unit 27 programmably controls combined actuations of both said number of infrared lamps 34 and said number of outlets 322 of said at least one first desiccating fan 32, in accordance to a structure and/or an outer contour of said pulp-molding article and said first inspecting signal generated from said at least one first detector 36. Said combined actuations comprises actuating sequence, the number of actuating times, and actuating time of any one of said number of infrared lamps 34 and said number of outlets 32, thereby self-adaptive eliminating different moistures contained within different portions within said initially-compressed semi-finished product 110. For example, said different portions of said initially-compressed semi-finished product 110 comprises at least one concave-surface structure 1122 where a bridge formation easily incurs, and/or at least one surface structure; preferably, said programmable control unit 27 can provide different combined actuations by preset programmable programs, in accordance to different structures and/or outer contours of said pulp-molding article, whereby while said programmable control unit 27 receives said first inspecting signal generated from said at least one first detector 36, said programmable control unit 27 instantly controls said number of infrared lamps 34 and said number of outlets 322 of said at least one first desiccating fan 32, in accordance to said corresponding combined actuations provided by itself, thereby respectively eliminating different moistures within said different portions of said initially-compressed semi-finished product 110, to form said dried semi-finished product 112 which is evenly dried more.

In a practical case, said intelligent-circulation desiccating device 30 as illustrated in FIG. 2, is disposed with in-sequence allocation of an infrared lamp 34 located at first location, an outlet 322 located at second location, an outlet 322 located at third location, an outlet 322 located at forth location, an infrared lamp 34 located at fifth location, and an outlet 322 located at sixth location, in a detachable manner along said conveying direction of said first conveying line 31 (namely, from left-side location to right-side location within said first conveying line 31), thereby making a part of said number of infrared lamps 34 and a part of said number of outlets 32 both alternately arranged. In operation, said programmable control unit 27 controls combined actuations of said infrared lamps 34 located at first location, said outlet 322 located at second location, said outlet 322 located at third location, said outlet 322 located at forth location, said infrared lamp 34 located at fifth location and said outlet 322 located at sixth location, in accordance to the structure and/or the outer contour of said pulp-molding article and said first inspecting signal generated from said at least one first detector 36. For example, said combined actuations are that: firstly enabling said infrared lamps 34 located at the first location to operate, namely irradiating infrared rays onto said semi-finished product 112, in order to eliminate surface moisture of said initially-compressed semi-finished product 110 for making product shaped; next enabling said outlet 322 located at the second location, said outlet 322 located at the third location, said outlet 322 located at the forth location to operate in sequence, thereby respectively making hot winds blowing, namely eliminating other moistures contained within different portions of said initially-compressed semi-finished product 110, in a hot-wind circulating manner; next, enabling said infrared lamp 34 located at the fifth location to operate, namely irradiating infrared rays onto at least one concave-surface structure 1122 where a bridge formation easily incurs within said initially-compressed semi-finished product 110 (as a location having a higher moisture content); and eventually enabling said outlet 322 located at the sixth location to operate, namely making hot wind blowing to eliminate remaining moistures contained within said initially-compressed semi-finished product 110. Accordingly, with the capability of self-adaptive eliminating different moistures contained within different portions of said initially-compressed semi-finished product 110, the averaged moisture content of said dried semi-finished product 112 is made less than 8%; nevertheless, the present invention is not limited to the foregoing combined actuations, because said programmable control unit 27 is capable of providing different corresponding combined actuations by preset programmable programs, in accordance to structures and/or outer contours (as locations with different heights and/or different thicknesses) of different pulp-molding articles (as having different volumetric scales). Said corresponding combined actuations are capable of having said programmable control unit 27 to make optimal controls on the actuating sequence, the number of actuating times, and actuating time of any one of said number of infrared lamps 34 and said number of outlets 32, in order to respectively eliminate different moistures of said different portions of said initially-compressed semi-finished product 110, thereby forming said dried semi-finished product 112 which is more evenly dried.

Please further refer to the illustration shown in FIG. 2, where said intelligently-wetting device 40 is configured to wet said dried semi-finished product 112 output from said intelligent-circulation desiccating device 30, thereby forming a wetted semi-finished product 114. Said intelligently-wetting device 40 comprises said second conveying line 41, at least one spray-sprinkling component 42 and at least one second detector 44. Said second conveying line 41 is configured to carry said dried semi-finished product 112 from the location of said intelligent-circulation desiccating device 30, and at the same time when said wetted semi-finished product 114 is formed in a wetting process, said wetted semi-finished product 114 is automatically conveyed to said thermo-compression forming stage 50. In another preferred embodiment, said first conveying line 31 and said second conveying line 41 both can be assembled in linkage; in another preferred embodiment, said first conveying line 31 and said second conveying line 41 belong to a part of said automatic actuating mechanism of said in-line automatic production-processing stages of said consistent production line 20.

In this preferred embodiment, said at least one spray-sprinkling component 42 comprises a number of spray-sprinkling components 42. Said number of spray-sprinkling components 42 are disposed in one-by-one arrangement along a direction of conveying said wetted semi-finished product 114 within said second conveying line 41; in another preferred embodiment, said at least one spray-sprinkling component 42 is movably disposed on a guiding rail (not shown) parallel to said conveying direction of said second conveying line 41, thereby making said at least one spray-sprinkling component 42 being capable of moving along said guiding rail; in another preferred embodiment, said at least one spray-sprinkling component 42 is capable of rotatably spray-sprinkling moistures. Said at least one second detector 44 is used to instantly inspect respective location where said dried semi-finished product 112 is located within said second conveying line 41 upon being conveyed, thereby correspondingly generating a second inspecting signal; in this preferred embodiment, said at least one second detector 44 comprises a number of second detectors 44. Said number of second detectors 44 are respectively corresponded to locations where the number of spray-sprinkling components 42 are located, and respectively are disposed in one-by-one arrangement along said conveying direction of said second conveying line 41 (Please refer to an arrow in FIG. 2).

For actuation of said intelligently-wetting device 40, said programmable control unit 46 programmably controls said at least one spray-sprinkling component 42 to spray-sprinkle a predetermined adaptive amount of water over at least one local location within said dried semi-finished product 112, in accordance to structures (as having different volumetric scales) and/or outer contours (as locations with different heights and/or different thicknesses) of different pulp-molding articles and said at least one second detector 44 generated from said second inspecting signal, thereby forming the wetted semi-finished product 114 which is spray-sprinkled; in this preferred embodiment, said at least one local location within said dried semi-finished product 112 is a local structure which has a local moisture content lower than local moisture contents at other locations located within said dried semi-finished product 112. By way of controlling spray-sprinkling for said at least one local location within said dried semi-finished product 112, the present invention is capable of equalizing moisture contents of entire structure of said wetted semi-finished product 114, thereby making averaged moisture content of said wetted semi-finished product 114 rising between 8% to 20%. This leads said pulp-molding article to have a capability of reserving appropriate mechanical properties, such as appropriate structural flexibility and rigidity, decreasing occurrence of watermarks, and being beneficial to the next processings; preferably, the averaged moisture content of said wetted semi-finished product 114 is 15%; nevertheless, noted is that, optimally averaged moisture content possibly differs dependent on different structural dimensions of different pulp-molding articles. Briefly, in accordance to structure (as having different volumetric scales) and/or outer contours (as locations with different heights and/or different thicknesses) that different local locations within said pulp-molding articles have, said programmable control unit 46 is capable of programmably controlling said at least one spray-sprinkling component 42 to spray-sprinkle predetermined different adaptive amount of water over said different local location of said dried semi-finished product 112, thereby making the entire structure of said wetted semi-finished product 114 having a more even moisture content. In speaking for a case, in accordance to a structure (as having different volumetric scales) and/or outer contours (as locations with different heights and/or different thicknesses) that one of said pulp-molding articles has, said programmable control unit 46 programmably controls said at least one spray-sprinkling component 42 to spray-sprinkle a amount of water, with a volumetric ratio from 9% to 11%, over a thicker location 1142, which has a local moisture content in low, within said dried semi-finished product 112, but also programmably controls said at least one spray-sprinkling component 42 to spray-sprinkle a amount of water, only with a volumetric ratio from 2% to 5%, over another thinner location, having a local moisture content in high, within said dried semi-finished product 112, thereby equalizing moisture contents of the entire structure of said wetted semi-finished product 114, to retain the averaged moisture content of said wetted semi-finished product 114 at approximate 15%. This is not only beneficial to the workability of the next processings (as processings of said thermo-compression forming stage 50 and said cutting stage 60 in the next) of said wetted semi-finished product 114 but also to make textural structures of the plant fibers of said pulp-molding articles (such as cushion pieces) achieving appropriate the flexibility and rigidity.

Generally speaking, by way of said programmable control unit 27 of the present invention programmably controlling in-sequence actuations of both said intelligent-circulation desiccating device 30 and said intelligently-wetting device 40, duty cycle time of said in-line intelligently drying apparatus 27 (containing duty cycle time of both said intelligent-circulation desiccating stage 30 and said intelligently-wetting stage) can be made less than 2 hours; nevertheless, for the structures of different pulp-molding articles, their duty cycle time possibly differ dependent thereon. For example, duty cycle time of both intelligent-circulation desiccating and said intelligently-wetting steps required for said pulp-molding articles structured in smaller size is possibly less than one hour; preferably, duty cycle time of said in-line intelligently drying apparatus 27 can be less than 45 minutes. Compared with both drying and moisture-regaining steps of the existing dry-type pulp-molding process which need to take a total duty cycle time of approximate from 72 to 96 hours, realized is that the present invention is capable of greatly reducing longer production time and higher labor costs required for dry-type pulp-molding technologies in the prior arts, thereby raising production efficiency and product yield.

Please further refer to the illustration shown in FIG. 2. In said thermo-compression forming stage 50, by way of upward-and-downward die-closing of a pair of male and female mold assembly 52, 54 for thermo-compression forming, said wetted semi-finished product 114 is thermally compressed to form a thermally-compressed semi-finished product 116 which has a three-dimensional structure in a more accurate dimension. Preferably, duty cycle time of said thermo-compression forming stage 50 is from 58 to 62 seconds, its working temperature range is from 150° C. to 165° C., averaged moisture content of said thermally-compressed semi-finished product 116 is from 3% to 5%; nevertheless, duty cycle time, working temperature range, and averaged moisture content for its thermo-compression possibly differ dependent on structures of the different pulp-molding articles. In the cutting stage 60, a die-cut mold is used to further excise superfluous edge corners on the periphery of said thermally-compressed semi-finished product 116 or to perforate, thereby eventually forming said pulp-molding article 118 such as cushion piece.

Please refer to an illustration shown in FIG. 3, which depicts a schematically step-flowing diagram of said pulp-molding process of a preferred embodiment according to the present invention. Please tie in all what the structures and functions of a consistent production line 20 are mentioned in each step of said pulp-molding process, with the depiction in FIG. 2 and the descriptions for the foregoing respective embodiments, and it will be omitted in the following contexts. As the illustrations shown in FIG. 2 and FIG. 3, said pulp-molding process according to the present invention is implemented in sequence, by way of in-sequence actuations of said multiple in-line automatic production-processing stages on said consistent production line 20, thereby accomplishing massive production for said pulp-molding article (such as cushion piece). Said pulp-molding process comprises in-sequence implementations of the following steps: a slurrying step S21, a pulp-dredging and forming step S24, an intelligent-circulation desiccating step S30, an intelligently-wetting step S40, a thermo-compression forming step S50, and a cutting step 60.

Said slurrying step S21, comprises: using wet plant fibers, as main raw material, to produce a slurry 11, and making said slurry 11 passing through a filtrating net 13 having a number of sieving holes, to filter out impurities, which are unmatched with size scales of said sieving holes, from said slurry 11, thereby uniformizing size scales of said wet plant fibers contained within said slurry 11, and storing said filtrated slurry 11' within said slurry tank 101.

Said pulp-dredging and forming step S24, comprises: by one mold (male mold 144 or female mold 142) of a pair of male and female mold assembly 142, 144 for pulp-dredging and forming, collectively dredging a wet rough body in a vacuum-suction manner, from the slurry 11' within said slurry tank 101 to be located between the male and female mold assembly 142, 144 for the pulp-dredging and forming; and next, enabling the male and female mold assembly 142, 144 for the pulp-dredging and forming, to be upward-and-downward die-closed with compressing said wet rough body, thereby integrally forming an initially-compressed semi-finished product 110 having a three-dimensional structure.

Said intelligent-circulation desiccating step S30, comprises: in accordance to a structure and/or an outer contour of said pulp-molding article, providing an implementation for said initially-compressed semi-finished product 110, which combines both infrared irradiation step S30a and hot-wind blowing step S30b, and which comprises implementing sequence, the number of implementing times, and implementing period of either of said infrared irradiation step S30a and said hot-wind blowing step S30b, thereby self-adaptive eliminating different moistures contained within different portions of said initially-compressed semi-finished product 110, to form a dried semi-finished product 112 which is evenly-dried; preferably, averaged moisture content of said dried semi-finished product 112 is less than 8%. In a preferred embodiment, said combined implementation comprises in-sequence implementations of implementing repeatedly said infrared irradiation step S30a and implementing repeatedly said hot-wind blowing step S30. In another preferred embodiment, said combined implementation comprises alternate implementations of both implement repeatedly said infrared irradiation step S30a and implementing repeatedly said hot-wind blowing step S30b. In another preferred embodiment, said said intelligent-circulation desiccating step S30 further comprises: providing different corresponding combined implementations, in accordance to structures of different pulp-molding articles (as having different volumetric scales) and/or outer contours (as locations with different heights and/or different thicknesses).

In a preferred embodiment, said pulp-molding process further comprises: by a programmable control unit 46, controlling in-sequence implementations of said intelligent-circulation desiccating step S30 and said intelligently-wetting step S40. Duty cycle time of the in-sequence implementations of both said intelligent-circulation desiccating step S30 and said intelligently-wetting step S40 is less than 2 hours; nevertheless, for structures of different pulp-molding articles, their duty cycle time possibly differ dependent thereon. For example, duty cycle time of both intelligent-circulation desiccating and said intelligently-wetting steps required for said pulp-molding articles having smaller-size structure possibly is less than one hour; preferably, duty cycle time of in-sequence implementations of both said intelligent-circulation desiccating step S30 and said intelligently-wetting step S40 is less than 45 minutes. Said intelligent-circulation desiccating step S30 comprises: by said programmable control unit 46 in accordance to the structure and/or the outer contour of said pulp-molding article and a first inspecting signal generated from at least one first detector 36 inspecting a location where said semi-finished product 110 is located relative to said production line 20, thereby controlling said combined implementation of both said infrared irradiation step S30a and said hot-wind blowing step S30b.

In a preferred embodiment, said infrared irradiation step S30a further comprises: by said programmable control unit 46 in accordance to the structure and/or the outer contour of said pulp-molding article and said first inspecting signal generated from said at least one first detector 36, controlling in-sequence actuations of a number of infrared lamps 34 located at different locations within said production line 20, to respectively irradiate infrared rays onto said different portions of said initially-compressed semi-finished product 110, thereby self-adaptive eliminating said different moistures contained within different portions of said initially-compressed semi-finished product 110. Working temperature range of said infrared irradiation step S30a is from 173° C. to 182° C. Said hot-wind blowing step S30b further comprises: by said programmable control unit 46 in accordance to the structure and/or the outer contour of said pulp-molding article and said first inspecting signal generated from said at least one first detector 36, controlling in-sequence actuations of a number of outlets 322 of at least one first desiccating fan 32 located at different locations within said production line 20, to respectively have hot winds blowing on said different portions of said semi-finished product 110, thereby self-adaptive eliminating different moistures contained within said different portions within said initially-compressed semi-finished product 110, for forming said dried semi-finished product 112 which is more evenly dried. Preferably, said different portions of said initially-compressed semi-finished product 110 comprises at least one concave-surface structure 1122 where a bridge formation easily incurs, and/or at least one surface structure. Preferably, a working temperature range of said hot-wind blowing step S30b is from 173° C. to 182° C.

Said intelligently-wetting step S40 comprises: in accordance to the structure and/or the outer contour of said pulp-molding article, spray-sprinkling a predetermined adaptive amount of water over at least one local location within said dried semi-finished product 112, thereby forming a wetted semi-finished product 114 having an averaged moisture content which rises between 8% to 20%; preferably, the averaged moisture content of said wetted semi-finished product 114 is 15%; nevertheless, optimally averaged moisture content possibly differs dependent on different structural dimensions of different pulp-molding articles; in a preferred embodiment, said intelligently-wetting step S40 comprises: by said programmable control unit 46 in accordance to the structure and/or the outer contour of said pulp-molding article and a second inspecting signal generated from said at least one second detector 44 inspecting a location where said dried semi-finished product 112 is located at said production line 20, controlling said at least one spray-sprinkling component 42 to spray-sprinkle said predetermined adaptive amount of water over said at least one local location within said dried semi-finished product 112, thereby forming said wetted semi-finished product 114 having that averaged moisture content; in this preferred embodiment. Said at least one local location within said dried semi-finished product 112 is a local structure which has a local moisture content lower than local moisture contents located at other locations within said dried semi-finished product 112. Preferably, said intelligently-wetting step S40 comprises: by said programmable control unit 46 in accordance to the structure and/or the outer contour of said pulp-molding article and the second inspecting signal generated from said at least one second detector 44 inspecting different location where said dried semi-finished product 112 is located within said production line 20, controlling said at least one spray-sprinkling component 42 to spray-sprinkle predetermined different adaptive amount of water over different local location within said dried semi-finished product 112, thereby equalizing moisture contents of entire structure of said wetted semi-finished product 114.

In said thermo-compression forming step S50, by way of upward-and-downward die-closing of a pair of male and female mold assembly 52, 54 for thermo-compression forming, said wetted semi-finished product 114 is thermally compressed, thereby forming a thermally-compressed semi-finished product 116 which has a three-dimensional structure with a more accurate dimension. Preferably, duty cycle time of implementing said thermo-compression forming step S50 is from 58 to 62 seconds, its working temperature range is from 150° C. to 165° C., an averaged moisture content of said thermally-compressed semi-finished product 116 is from 3% to 5%; nevertheless, for structures of different pulp-molding articles, their duty cycle time, working temperature range, and averaged moisture content of thermo-compression possibly differ dependent thereon.

In said cutting step S60, a die-cut mold is employed to further excise superfluous edge corners on periphery of said thermally-compressed semi-finished product 116 or to perforate, thereby eventually forming said pulp-molding article 118 such as cushion piece.

In conclusion, compared with the prior arts, said pulp-molding process according to the present invention is utilized with capability of totally accomplishing consistent production line 20 having multiple in-line automatic production-processing stages which are implemented in sequence, for massive production of pulp-molding article such as cushion pieces, and thus is capable of greatly reducing longer production time and higher labor costs required for the dry-type pulp-molding technologies in the prior arts, thereby raising production efficiency and product yield; and, said in-line intelligently drying apparatus 27 according to the present invention is utilized with capability of self-adaptive eliminating different moistures contained within different portions within said initially-compressed semi-finished product 110 of said pulp-molding article, to form said dried semi-finished product 112 which is more evenly dried, and is capable of spray-sprinkling a predetermined adaptive amount of water over at least one local location within said dried semi-finished product 112, thereby forming the wetted semi-finished product 114 having the averaged moisture content, in order to avoid poor mechanical property matters or a difficulty of implementing the next processings, resulting from overhigh or overlow moisture-regaining ratio of a partial structure of said moisture-regaining semi-finished product (or a paper-made article) in the prior arts.

The foregoing contexts just tied in with drawings are described corresponding to concretely embodied manners of the present invention, rather than to restrict protective scope of the present invention, it should be realized for skilled persons that pertain to the field, that on a basis of technical solutions of the present invention, a variety of modifications or variation that are directly made, without implementation of creative work, by the skilled persons that pertain to the field, are still within protective scope of the present invention.

What is claimed is:

1. A pulp-molding process, used with multiple in-line automatic production-processing stages implemented sequentially to accomplish a consistent production line for pulp-molding article, comprising implementing the following steps in sequence:

slurrying step, comprising: using wet plant fibers, as main raw material, to produce slurry, and making said slurry stored within slurry tank;

pulp-dredging and forming step, comprising: by one mold of a pair of male and female mold assembly for pulp-dredging and forming, collectively dredging a wet rough body in a vacuum-suction manner, from the slurry within said slurry tank to be located between the male and female mold assembly for the pulp-dredging and forming; and next, enabling the male and female mold assembly for the pulp-dredging and forming, to be die-closed with compressing said wet rough body, thereby integrally forming an initially-compressed semi-finished product having three-dimensional structure;

thermo-compression forming step;

and wherein said pulp-molding process further comprises: implementing an intelligent-circulation desiccating step and an intelligently-wetting step in sequence, between said thermo-compression forming step and said pulp-dredging and forming step, wherein said intelligent-circulation desiccating step comprises: in accordance to a structure and/or an outer contour of said pulp-molding article, providing an implementation which combines both infrared irradiation step and hot-wind blowing step, for said initially-compressed semi-finished product, and which comprises implementing sequence, the number of implementing times, and implementing period of either of said infrared irradiation step and said hot-wind blowing step, thereby self-adaptive eliminating said different moistures contained within different portions of the initially-compressed semi-finished product, to form a dried semi-finished product which is evenly-dried, and said intelligently-wetting step comprises: in accordance to the structure and/or the outer contour of said pulp-molding article, spray-sprinkling a predetermined adaptive amount of water over at least one local location within said dried semi-finished product, to form a wetted semi-finished product which is spray-sprinkled, thereby equalizing moisture contents of entire structure of said wetted semi-finished product to make averaged moisture content of said wetted semi-finished product rising between 8% to 20%, and in said thermo-compression forming step, said wetted semi-finished product is thermally compressed to form a thermally-compressed semi-finished product, by way of die-closing of a pair of male and female mold assembly for thermo-compression forming.

2. The pulp-molding process as claimed in claim 1, wherein said slurrying step further comprises: making said slurry passing through a filtrating net having a number of sieving holes, to filter out impurities, which are unmatched with size scales of said sieving holes, from said slurry, thereby uniformizing size scales of said plant fibers contained within said slurry, and storing said filtrated slurry within said slurry tank.

3. The pulp-molding process as claimed in claim 1, wherein said pulp-molding process further comprises: in accordance to different structures and/or outer contours of said pulp-molding article, providing different combined implementations.

4. The pulp-molding process as claimed in claim 1, wherein said pulp-molding process further comprises: by a programmable control unit, controlling in-sequence implementations of said intelligent-circulation desiccating step and said intelligently-wetting step, between said thermo-compression forming step and said pulp-dredging and forming step, wherein said intelligent-circulation desiccating step comprises: by said programmable control unit in accordance to the structure and/or the outer contour of said pulp-molding article and a first inspecting signal generated from at least one first detector inspecting a location where said initially-compressed semi-finished product is located relative to said production line, further controlling said combined implementations of both said infrared irradiation step and said hot-wind blowing step, and said intelligently-wetting step comprises: by said programmable control unit in accordance to the structure and/or the outer contour of said pulp-molding article and a second inspecting signal generated from at least one second detector inspecting a location where said dried semi-finished product is located at said production line, spray-sprinkling said predetermined adaptive amount of water over said at least one local location which is desiccated within said dried semi-finished product, thereby equalizing moisture contents of entire structure of said wetted semi-finished product.

5. The pulp-molding process as claimed in claim 4, wherein said infrared irradiation step comprises: by said programmable control unit in accordance to the structure and/or the outer contour of said pulp-molding article and said first inspecting signal generated from said at least one first detector, controlling in-sequence actuations of a number of infrared lamps located at different locations within said production line, to respectively irradiate infrared rays onto said different portions of said initially-compressed semi-finished product, thereby self-adaptive eliminating said different moistures contained within different portions of said initially-compressed semi-finished product.

6. The pulp-molding process as claimed in claim 5, wherein said different portions of said initially-compressed semi-finished product comprise at least one concave-surface structure where bridge formation easily incurs, and/or at least one surface structure.

7. The pulp-molding process as claimed in claim 4, wherein said hot-wind blowing step comprises: by said programmable control unit in accordance to the structure and/or the outer contour of said pulp-molding article and said first inspecting signal generated from said at least one first detector, controlling in-sequence actuations of a number of outlets of at least one first desiccating fan, which are located at different locations within said production line, to respectively have hot winds blowing on said different portions of said initially-compressed semi-finished product, thereby self-adaptive eliminating said different moistures contained within different portions of said initially-compressed semi-finished product.

8. The pulp-molding process as claimed in claim 4, wherein said intelligently-wetting step comprises: by said programmable control unit in accordance to the structure and/or the outer contour of said pulp-molding article and said second inspecting signal generated from said at least one second detector, controlling at least one spray-sprinkling component to spray-sprinkle predetermined different adaptive amount of water over different location within said dried semi-finished product, thereby equalizing moisture contents of entire structure of said wetted semi-finished product.

9. The pulp-molding process as claimed in claim 8, wherein said at least one local location within said dried semi-finished product is a local structure which has a local moisture content lower than local moisture contents at other locations located within said dried semi-finished product.

10. The pulp-molding process as claimed in claim 1, wherein averaged moisture content of said dried semi-finished product is less than 8%, and duty cycle time of the in-sequence implementations of both said intelligent-circulation desiccating step and said intelligently-wetting step is less than 2 hours.

11. An in-line intelligently drying apparatus, used with a consistent production line, where a pulp-molding process is implemented, and multiple in-line automatic production-processing stages that comprise pulp-dredging and forming stage and thermo-compression forming stage are implemented in sequence, for massive production of pulp-molding article, and wherin said in-line intelligently drying apparatus comprises:

at least one conveying line;

an intelligent-circulation desiccating device, configured to dry an initially-compressed semi-finished product output from said pulp-dredging and forming stage, thereby forming a dried semi-finished product, and said intelligent-circulation desiccating device comprising a number of infrared lamps located at different locations within said at least one conveying line, at least one first desiccating fan, and at least one first detector, where said at least one first detector is used to generate a first inspecting signal from inspecting a location at which said initially-compressed semi-finished product is located relative to said at least one conveying line, and where said at least one first desiccating fan has a number of outlets located at different locations within said at least one conveying line;

an intelligently-wetting device, used to wet said dried semi-finished product output from said intelligent-circulation desiccating device, and comprising at least one spray-sprinkling component and at least one second detector, where said at least one spray-sprinkling component is disposed along said at least one conveying line, and where said at least one second detector is used to generate a second inspecting signal from inspecting a location at which said dried semi-finished product is located relative to said at least one conveying line; and a programmable control unit, controlling in-sequence actuations of both said intelligent-circulation desiccating device and said intelligently-wetting device, wherein said programmable control unit controls an implementation of combining both said number of infrared lamps and said number of outlets of said at least one first desiccating fan, in accordance to a structure and/or an outer contour of said pulp-molding article and said first inspecting signal generated from said at least one first detector, said combined actuations comprises actuating sequence, the number of actuating times, and actuating time of either of said number of infrared lamps and said number of outlets, thereby self-adaptive eliminating said different moistures contained within different portions of initially-compressed semi-finished product, to form said dried semi-finished product which is evenly dried, and said programmable control unit, in accordance to the structure and/or the outer contour of said pulp-molding article and said second inspecting signal generated from said at least one second detector, controls said at least one spray-sprinkling component to spray-sprinkle a predetermined adaptive amount of water over at least one local location within said dried semi-finished product, thereby forming a wetted semi-finished product having an averaged moisture content.

12. The in-line intelligently drying apparatus as claimed in claim 11, wherein said programmable control unit provides different combined actuations, in accordance to different structures and/or outer contours of said pulp-molding article.

13. The in-line intelligently drying apparatus as claimed in claim 11, wherein said different portions of said initially-compressed semi-finished product comprise at least one concave-surface structure where bridge formation easily incurs, and/or at least one surface structure.

14. The in-line intelligently drying apparatus as claimed in claim 11, wherein said at least one local location within said dried semi-finished product is a local structure which has a local moisture content lower than local moisture contents located at other locations located within said dried semi-finished product.

15. The in-line intelligently drying apparatus as claimed in claim 11, wherein said programmable control unit controls said at least one spray-sprinkling component to spray-sprinkle predetermined different adaptive amount of water over different location within said dried semi-finished product, in accordance to the structure and/or the outer contour of said pulp-molding article and said second inspecting signal generated from said at least one second detector.

* * * * *